United States Patent
Jang et al.

(10) Patent No.: US 10,566,816 B2
(45) Date of Patent: Feb. 18, 2020

(54) BATTERY CHARGING METHOD WITH MUTIPLE CONSTANT VOLTAGES AND BATTERY CHARGING APPARATUS EMPLOYING THE SAME

(71) Applicant: Samsung SDI Co., Ltd., Yongin-si, Gyeonggi-do (KR)

(72) Inventors: Yoohong Jang, Yongin-si (KR); Seungyeon Kang, Yongin-si (KR); Hoyul Baek, Yongin-si (KR); Hyunju Oh, Yongin-si (KR); Jake Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 116 days.

(21) Appl. No.: 15/616,531

(22) Filed: Jun. 7, 2017

(65) Prior Publication Data
US 2018/0054068 A1 Feb. 22, 2018

(30) Foreign Application Priority Data
Aug. 22, 2016 (KR) .................. 10-2016-0106174

(51) Int. Cl.
*H02J 7/00* (2006.01)
(52) U.S. Cl.
CPC .......... *H02J 7/007* (2013.01); *H02J 7/0068* (2013.01); *H02J 7/0077* (2013.01)
(58) Field of Classification Search
CPC ......... H02J 7/007; H02J 7/0077; H02J 7/0068
USPC ...................................................... 320/107
See application file for complete search history.

(56) References Cited

U.S. PATENT DOCUMENTS

| | | | | |
|---|---|---|---|---|
| 5,442,274 A * | 8/1995 | Tamai | ................... | H02J 7/0093 320/146 |
| 5,696,437 A * | 12/1997 | Panther | ............ | G01R 19/16542 320/DIG. 21 |
| 5,790,478 A * | 8/1998 | Besson | .............. | G04C 17/0066 368/66 |
| 6,087,810 A * | 7/2000 | Yoshida | ................ | H02J 7/0077 320/139 |

(Continued)

FOREIGN PATENT DOCUMENTS

| | | |
|---|---|---|
| JP | 2015-171275 A | 9/2015 |
| KR | 10-0901594 | 6/2009 |

(Continued)

OTHER PUBLICATIONS

EPO Extended Search Report dated Feb. 7, 2018, for corresponding European Patent Application No. 17183572.1 (7 pages).

*Primary Examiner* — Robert Grant
*Assistant Examiner* — John T Trischler
(74) *Attorney, Agent, or Firm* — Lewis Roca Rothgerber Christie LLP

(57) ABSTRACT

A method of charging a battery, wherein the battery comprises a plurality of battery cells, includes charging the battery with a first voltage for a first time period, which charging is first charging, charging the battery with a second voltage for a second time period, which charging is second charging, and charging the battery with a third voltage for a third time period, which charging is third charging, wherein lengths of the first to third time periods are determined in correspondence with a magnitude of charging current of the battery.

10 Claims, 8 Drawing Sheets

(56) References Cited

U.S. PATENT DOCUMENTS

| | | | | |
|---|---|---|---|---|
| 6,094,033 A * | 7/2000 | Ding | H01M 10/44 | 320/132 |
| 6,229,285 B1 * | 5/2001 | Ding | H01M 10/44 | 320/132 |
| 6,275,006 B1 * | 8/2001 | Koike | H02J 7/0073 | 320/125 |
| 6,563,318 B2 * | 5/2003 | Kawakami | G01R 31/3662 | 320/132 |
| 7,078,878 B2 * | 7/2006 | Koo | G01R 31/3631 | 320/132 |
| 7,339,354 B2 * | 3/2008 | Sanpei | H02J 7/0073 | 320/129 |
| RE40,223 E * | 4/2008 | Koike | H02J 7/0073 | 320/125 |
| 7,375,491 B2 * | 5/2008 | Lin | H02J 7/0073 | 320/107 |
| 7,688,032 B2 * | 3/2010 | Kamishima | G01R 31/361 | 320/132 |
| 7,688,075 B2 * | 3/2010 | Kelley | G01R 31/3662 | 320/132 |
| 7,973,515 B2 * | 7/2011 | Densham | H02J 7/00 | 320/130 |
| 8,013,577 B2 * | 9/2011 | Nishino | H02J 7/0073 | 320/152 |
| 8,111,038 B2 * | 2/2012 | Wang | B60L 11/1816 | 180/165 |
| 8,305,040 B2 * | 11/2012 | Chen | H02J 7/0057 | 320/132 |
| 8,305,045 B2 * | 11/2012 | Maeagawa | H02J 7/008 | 320/139 |
| 8,344,700 B2 * | 1/2013 | Nagashima | H01M 10/052 | 320/152 |
| 8,476,868 B2 * | 7/2013 | Rufer | A61M 5/14244 | 320/114 |
| 8,552,693 B2 * | 10/2013 | Paryani | H02J 7/047 | 320/104 |
| 8,643,342 B2 * | 2/2014 | Mehta | H02J 7/0073 | 320/160 |
| 8,754,614 B2 * | 6/2014 | Paryani | H01M 10/0525 | 320/162 |
| 8,816,648 B2 * | 8/2014 | Bhardwaj | H02J 7/0073 | 320/152 |
| 8,890,486 B2 * | 11/2014 | Xiao | H02J 7/0073 | 320/160 |
| 8,896,272 B2 * | 11/2014 | Hawawini | H02J 7/0073 | 320/148 |
| 8,912,762 B2 * | 12/2014 | Suzuki | H01M 4/525 | 320/160 |
| 8,970,170 B2 * | 3/2015 | Rufer | A61M 5/14244 | 320/114 |
| 8,970,182 B2 * | 3/2015 | Paryani | H01M 10/0525 | 320/162 |
| 9,048,679 B2 * | 6/2015 | Patino | H02J 7/0086 | |
| 9,081,068 B2 * | 7/2015 | Mattisson | G01R 31/361 | |
| 9,157,968 B1 * | 10/2015 | Taylor | G01R 31/3662 | |
| 9,159,990 B2 * | 10/2015 | Amiruddin | H01M 4/131 | |
| 9,419,450 B2 * | 8/2016 | Paryani | H01M 10/0525 | |
| 9,484,765 B2 * | 11/2016 | Kim | H02J 7/041 | |
| 9,553,301 B2 * | 1/2017 | Amiruddin | H01M 4/131 | |
| 9,627,719 B2 * | 4/2017 | Jung | H01M 10/44 | |
| 9,651,628 B2 * | 5/2017 | Mattisson | G01R 31/361 | |
| 9,917,458 B2 * | 3/2018 | Lee | H02J 7/0077 | |
| 9,933,491 B2 * | 4/2018 | Takahashi | H01M 10/425 | |
| 2002/0109506 A1 * | 8/2002 | Kawakami | G01R 31/3662 | 324/522 |
| 2005/0194938 A1 * | 9/2005 | Sanpei | H02J 7/0073 | 320/141 |
| 2006/0238203 A1 * | 10/2006 | Kelley | G01R 31/3662 | 324/433 |
| 2008/0030169 A1 * | 2/2008 | Kamishima | G01R 31/361 | 320/134 |
| 2009/0001937 A1 * | 1/2009 | Densham | H02J 7/00 | 320/145 |
| 2009/0055110 A1 * | 2/2009 | Kelley | G01R 31/3662 | 702/63 |
| 2009/0096425 A1 * | 4/2009 | Barza | H02J 7/0081 | 320/156 |
| 2009/0295338 A1 * | 12/2009 | Hawawini | H01M 10/44 | 320/157 |
| 2010/0194351 A1 * | 8/2010 | Nagashima | H01M 10/052 | 320/152 |
| 2010/0327810 A1 * | 12/2010 | Jimbo | B60W 10/26 | 320/126 |
| 2011/0006731 A1 * | 1/2011 | Wang | B60L 11/1816 | 320/109 |
| 2011/0012562 A1 * | 1/2011 | Paryani | H02J 7/047 | 320/152 |
| 2011/0012563 A1 * | 1/2011 | Paryani | H01M 10/0525 | 320/162 |
| 2011/0037438 A1 * | 2/2011 | Bhardwaj | H02J 7/0073 | 320/152 |
| 2011/0037439 A1 * | 2/2011 | Bhardwaj | H01M 4/13 | 320/152 |
| 2011/0156661 A1 * | 6/2011 | Mehta | H02J 7/0073 | 320/160 |
| 2011/0169459 A1 * | 7/2011 | Chen | H02J 7/0057 | 320/160 |
| 2011/0266998 A1 * | 11/2011 | Xiao | H02J 7/0073 | 320/107 |
| 2012/0086406 A1 * | 4/2012 | Maeagawa | H02J 7/008 | 320/162 |
| 2012/0112703 A1 * | 5/2012 | Xu | H02J 7/0022 | 320/145 |
| 2012/0133338 A1 * | 5/2012 | Suzuki | H01M 4/525 | 320/160 |
| 2013/0043843 A1 * | 2/2013 | Amiruddin | H01M 4/131 | 320/128 |
| 2013/0080096 A1 * | 3/2013 | Toki | G01R 31/3624 | 702/63 |
| 2013/0162196 A1 * | 6/2013 | Li | H02J 7/041 | 320/107 |
| 2014/0002007 A1 * | 1/2014 | Patino | H02J 7/0086 | 320/107 |
| 2014/0077815 A1 * | 3/2014 | Mattisson | G01R 31/361 | 324/426 |
| 2014/0253023 A1 * | 9/2014 | Paryani | H01M 10/0525 | 320/107 |
| 2014/0375278 A1 * | 12/2014 | Kim | H02J 7/041 | 320/155 |
| 2015/0022160 A1 * | 1/2015 | Greening | H02J 7/0077 | 320/162 |
| 2015/0077058 A1 * | 3/2015 | Jung | H01M 10/44 | 320/112 |
| 2015/0130417 A1 * | 5/2015 | Song | H02J 7/0052 | 320/112 |
| 2015/0171644 A1 * | 6/2015 | Paryani | H01M 10/0525 | 320/137 |
| 2015/0364748 A1 * | 12/2015 | Amiruddin | H01M 4/131 | 205/59 |
| 2015/0380953 A1 * | 12/2015 | Keates | H02J 7/007 | 320/162 |
| 2016/0006272 A1 * | 1/2016 | Greening | H02J 7/0008 | 320/162 |
| 2016/0011273 A1 * | 1/2016 | Mattisson | G01R 31/361 | 320/107 |
| 2016/0064967 A1 | 3/2016 | Lee et al. | | |
| 2017/0288417 A1 * | 10/2017 | Trichy | H02J 7/007 | |

FOREIGN PATENT DOCUMENTS

| | | |
|---|---|---|
| KR | 10-0906872 | 7/2009 |
| KR | 10-2015-0019372 A | 2/2015 |
| KR | 10-1609719 | 4/2016 |

* cited by examiner

BATTERY CHARGING METHOD WITH MUTIPLE CONSTANT VOLTAGES AND BATTERY CHARGING APPARATUS EMPLOYING THE SAME

CROSS-REFERENCE TO RELATED APPLICATION

This application claims priority to and the benefit of Korean Patent Application No. 10-2016-0106174, filed on Aug. 22, 2016, in the Korean Intellectual Property Office, the disclosure of which is incorporated herein in its entirety by reference.

BACKGROUND

1. Field

Aspects of the present disclosure relate to a battery charging method and a battery charging apparatus using the battery charging method.

2. Description of the Related Art

Resistance of a battery has a non-linear characteristic that varies during a charging process, according to a C-rate, a state of charge (SOC), temperature, and/or the like. Among battery charging methods according to the related art, a step constant current (CC)/constant voltage (CV) charging method generates linear stress in a CC section, thereby generating a plurality of sections in which by-products are generated.

In addition, even when the lifespan of the battery degrades and resistance increases during the CC section, current of the same magnitude is applied, which may cause additional deterioration. Also, according to the step CC/CV charging method, if there is a difference between the performances of cells constituting a battery pack unit, over-charging and over-discharging concentrate in some of the cells, thereby degrading the total performance of the battery pack.

SUMMARY

Aspects of one or more embodiments are directed to a battery charging method capable of increasing the lifespan of a battery, by decreasing stress elements applied during charging of a battery and applying electric current corresponding to characteristics of each cell constituting a battery pack, and a battery charging apparatus employing the battery charging method.

Aspects of one or more embodiments are directed to a battery charging method, by which a battery is charged with a constant stepwise voltage that is a charging voltage determined by taking into account a characteristic of varying resistance during the charging of the battery, and the battery charging apparatus employing the battery charging method.

Additional aspects will be set forth in part in the description which follows and, in part, will be apparent from the description, or may be learned by practice of the presented embodiments.

According to one or more embodiments, there is provided a method of charging a battery, wherein the battery comprises a plurality of battery cells, the method including: charging the battery with a first voltage for a first time period, which charging is first charging; charging the battery with a second voltage for a second time period, which charging is second charging; and charging the battery with a third voltage for a third time period, which charging is third charging, wherein lengths of the first to third time periods are determined in correspondence with a magnitude of charging current of the battery.

In some embodiments, the lengths of the first time period, the second time period, and the third time period are time periods taken for a value of the charging current in the first, second, and third charging to reach a first threshold value, a second threshold value, and a third threshold value, respectively.

In some embodiments, the first threshold value is equal to or greater than the second threshold value, and the second threshold value is equal to or greater than the third threshold value.

In some embodiments, the first to third threshold values are charging current values at a time point when an internal resistance value of the battery is stabilized in the first charging, the second charging, and the third charging, respectively.

In some embodiments, the method further includes determining magnitudes of the first to third voltages.

In some embodiments, the determining of the magnitudes of the first to third voltages includes determining the magnitudes of the first to third voltages as voltage values, each of the voltage values being included in a voltage range corresponding to a peak point in an internal resistance variation curve, against time, of the battery.

According to one or more embodiments, there is provided a battery charging apparatus for a battery, wherein the battery includes a plurality of battery cells, the battery charging apparatus including: a memory configured to store information about magnitudes of a first voltage, a second voltage, and a third voltage that are charging voltages for charging the battery, wherein the battery is charged with the first voltage, the second voltage, and the third voltage respectively within a first time period, a second time period, and a third time period, and lengths of the first to third time periods correspond with a magnitude of charging current of the battery.

In some embodiments, the lengths of the first to third time periods are time periods taken for a value of the charging current in the first to third time periods to respectively reach a first threshold value, a second threshold value, and a third threshold value.

In some embodiments, the first threshold value is equal to or greater than the second threshold value, and the second threshold value is equal to or greater than the third threshold value.

In some embodiments, the first to third threshold values are charging current values at a time point when an internal resistance value of the battery is stabilized in respective charging stages.

In some embodiments, magnitudes of the first to third voltages are voltage values, each of the voltage values being included in a voltage range corresponding to a peak point in an internal resistance variation curve, against time, of the battery according to time.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
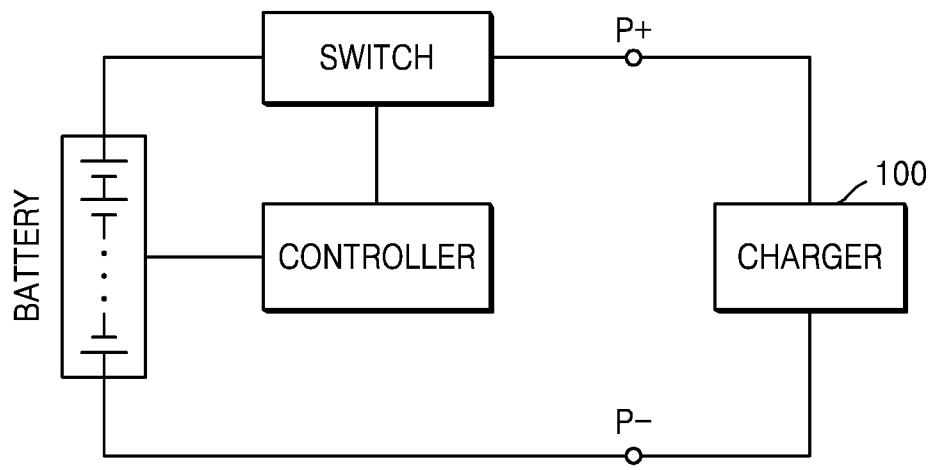
FIG. 1 is a block diagram of a battery charging apparatus according to an example embodiment of the present disclosure.

Exemplary embodiments will be described in more detail below with reference to accompanying drawings. However, the present disclosure may be implemented in various aspects, and should not be construed to be limited to one or more embodiments provided herein. The embodiments are provided for complete disclosure and thorough understanding of the invention by those skilled in the art.

Hereinafter, one or more exemplary embodiments will be provided with reference to accompanying drawings. Like reference numerals denote the same elements. In the drawings, like reference numerals are provided to the same or corresponding elements, and descriptions thereof are not repeated.

FIG. 1 is a block diagram of a battery charging apparatus according to an example embodiment of the present disclosure.

Referring to FIG. 1, the battery charging apparatus (charger) 100 according to an embodiment is connected to a battery or a battery pack to supply power to the battery or the battery pack.

The battery may include a plurality of battery cells that may be charged and discharged, and may configure a battery pack with a switch and a controller.

The switch may include a charging switch and a discharging switch that are turned on/off by receiving control signals output from the controller, and when the charging switch is in a turn-on state, charging current supplied from the charger 100 is input to the battery.

In addition, when the discharging switch is in a turn-on state, discharging current output from the battery is transferred to a system or a load connected to the battery pack.

The controller monitors a state of the battery, and controls switching operations of the switch. Status information of the battery monitored by the controller may include a cell voltage, temperature, current, and/or the like. A charging capacity, remaining lifespan, and/or the like of the battery may be calculated based on the status information of the battery.

The charger 100 includes a memory that stores information about magnitudes of a first voltage $V_1$, a second voltage $V_2$, and a third voltage $V_3$ that are charging voltages for charging the battery.

In addition, the charger 100 charges the battery with the first voltage $V_1$, the second voltage $V_2$, and the third voltage $V_3$ respectively for a first time period, a second time period, and a third time period. Lengths of the first time period, the second time period, and the third time period are determined based on a magnitude of the charging current of the battery.

For example, the lengths of the first time period, the second time period, and the third time period may be the time taken for the charging current in the respective time periods to reach a first threshold value, a second threshold value, and a third threshold value.

For example, when the magnitude of the charging current reaches the first threshold value while the battery is charged with the first voltage $V_1$, the charger 100 charges the battery with the second voltage $V_2$.

When the battery is charged by applying a voltage of a constant magnitude, the magnitude of the charging current supplied to the battery gradually decreases, and when the magnitude of the charging current reaches the threshold value set in advance, the magnitude of the charging voltage may be switched to a voltage of a next stage determined in advance.

Therefore, the lengths of the first to third time periods are not determined in advance, and may be set as the time taken to reach the first to third threshold values.

Figure 2:
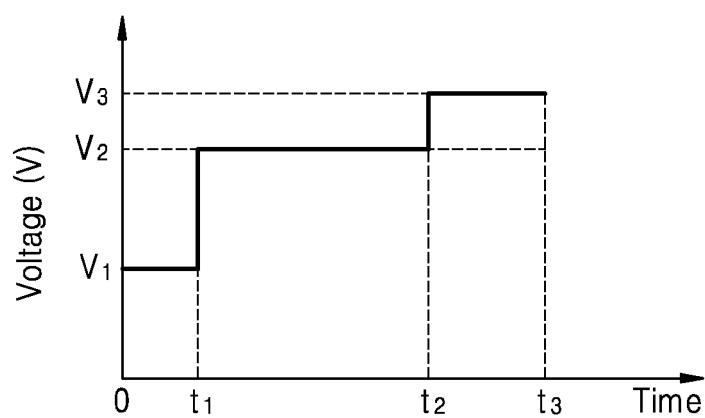
FIG. 2 is a graph exemplarily showing a battery charging voltage according to an example embodiment of the present disclosure.

FIG. 2 is a graph exemplarily showing a battery charging voltage according to an example embodiment of the present disclosure.

Referring to the graph of FIG. 2, according to the battery charging method and the battery charging apparatus employing the battery charging method of the present embodiment, constant voltages from the first voltage to the third voltage are sequentially applied to charge the battery.

In the graph of FIG. 2, the transverse axis (i.e., the horizontal axis) denotes time and the longitudinal axis (i.e., the vertical axis) denotes a magnitude of the charging voltage applied to the battery. Among the first voltage $V_1$, the second voltage $V_2$, and the third voltage $V_3$ applied to the battery, the first voltage $V_1$ has the smallest magnitude and the third voltage $V_3$ has the largest magnitude.

In addition, the first voltage $V_1$ is applied during the first time period (0 to $t_1$), the second voltage $V_2$ is applied during the second time period ($t_1$~$t_2$), and the third voltage $V_3$ is applied during the third time period ($t_2$~$t_3$).

As described above, the lengths of the first to third time periods are not determined in advance, and the charging voltage is applied to the battery until a time point when the magnitude of the charging current supplied to the battery reaches the threshold value set in advance.

Figure 3:
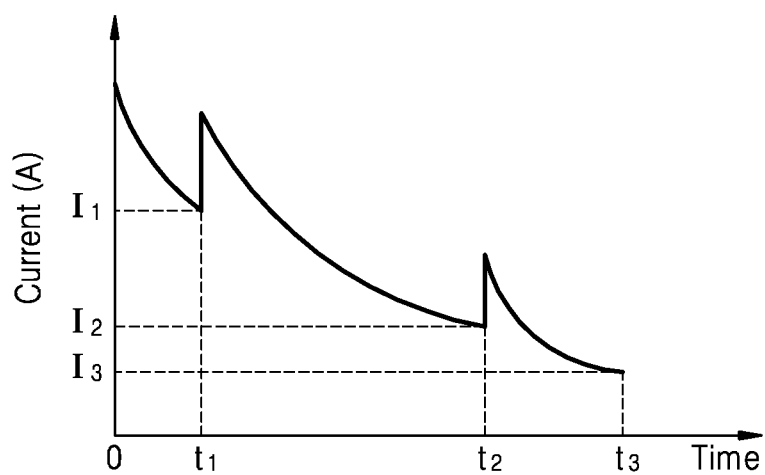
FIG. 3 is a graph exemplarily showing a battery charging current according to an example embodiment of the present disclosure.

FIG. 3 is a graph exemplarily showing a battery charging current according to an example embodiment of the present disclosure.

In the graph of FIG. 3, the transverse axis (i.e., the horizontal axis) denotes time and the longitudinal axis (i.e., the vertical axis) denotes a magnitude of charging current supplied to the battery. In addition, time points $t_1$, $t_2$, and $t_3$ in the transverse axis are equal to the time points $t_1$, $t_2$, and $t_3$ in the graph of FIG. 2.

As described above, the magnitude of the charging current gradually decreases from the time point when the charging voltage is applied from the charger during the charging of the battery.

During the first time period (0~$t_1$), the magnitude of the charging current supplied to the battery decreases gradually, and when the magnitude of the charging current reaches a first threshold value $I_1$, the second voltage $V_2$ is applied to the battery. During the second time period ($t_1$~$t_2$), the second voltage $V_2$ is applied as the charging voltage, and the magnitude of the charging current gradually decreases during the second time period ($t_1$~$t_2$), and thus, when the magnitude of the charging current reaches a second threshold value $I_2$, the third voltage $V_3$ is applied to the battery.

Likewise, the third voltage $V_3$ is applied as the charging voltage during the third time period ($t_2$~$t_3$), and the magnitude of the charging current gradually decreases during the third time period ($t_2$~$t_3$) and when the magnitude reaches a threshold value $I_3$, the charging of the battery may be finished.

As shown in the graph of FIG. 3, the first threshold value $I_1$ is equal to or greater than the second threshold value $I_2$, and the second threshold value $I_2$ is equal to or greater than the third threshold value $I_3$.

In addition, the first to third threshold values $I_1$, $I_2$, and $I_3$ may be determined as values of the charging current at a time point when an internal resistance value of the battery is stabilized in corresponding charging stages. In an example, the first to third threshold values $I_1$, $I_2$, and $I_3$ may be determined as values of the charging current at a time point when battery cells included in the battery are stabilized.

Therefore, the magnitudes of the charging voltages $V_1$, $V_2$, and $V_3$ described above with reference to FIG. 2 and the magnitudes of the first to third threshold values $I_1$, $I_2$, and $I_3$ may vary depending on characteristics of the battery, and are determined prior to the charging of the battery.

Figure 4:
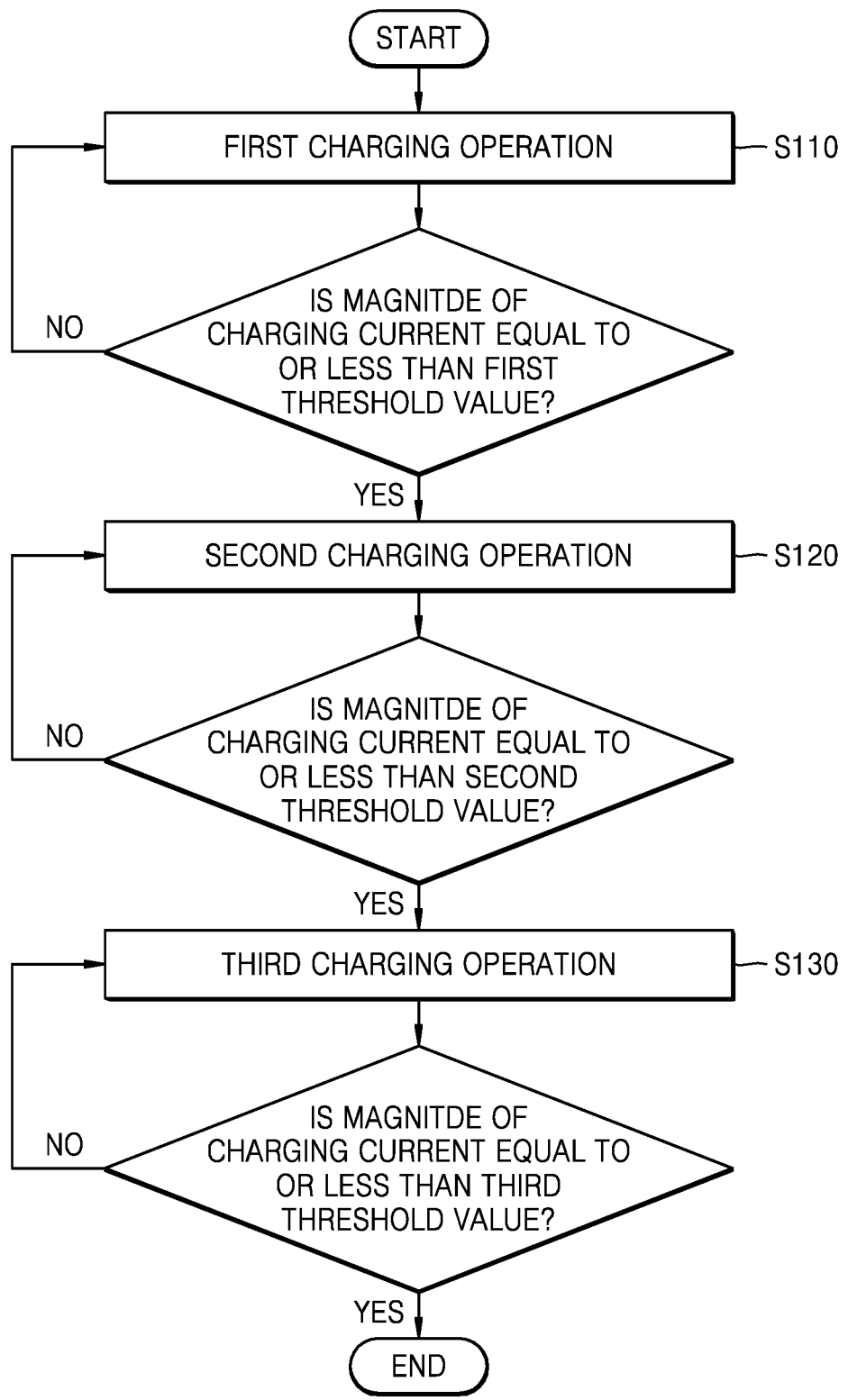
FIG. 4 is a flowchart of a battery charging method according to an example embodiment of the present disclosure.

FIG. 4 is a flowchart of a battery charging method according to an example embodiment of the present disclosure.

Referring to FIG. 4, the battery charging method according to the embodiment is a method of charging a battery having a plurality of battery cells, and includes a first charging operation (S110) in which the battery is charged with the first voltage $V_1$, a second charging operation (S120) in which the battery is charged with the second voltage $V_2$, and a third charging operation (S130) in which the battery is charged with the third voltage $V_3$.

In the first charging operation (S110), the battery is charged with the first voltage V1 for the first time period (0~$t_1$), in the second charging operation (S120), the battery is charged with the second voltage $V_2$ for the second time period ($t_1$~$t_2$), and in the third charging operation (S130), the battery is charged with the third voltage $V_3$ for the third time period ($t_2$~$t_3$). Here, the lengths of the first to third time periods are determined in correspondence with the magnitudes of the charging current of the battery.

For example, the lengths of the first time period (0~$t_1$), the second time period ($t_1$~$t_2$), and the third time period ($t_2$~$t_3$) may be time for the charging current values in the respective time periods to reach the first, second, and third threshold values.

For example, when the magnitude of the charging current reaches the first threshold value while the battery is charged with the first voltage $V_1$, the battery is charged with the second voltage $V_2$.

When the battery is charged by applying a voltage of a constant magnitude, the magnitude of the charging current supplied to the battery gradually decreases, and when the magnitude of the charging current reaches the threshold value set in advance, the magnitude of the charging voltage may be switched to a voltage of a next stage, which is determined in advance.

Therefore, the lengths of the first to third time periods are not determined in advance, and may be set as the time taken to reach the first to third threshold values.

As described above with reference to FIG. 3, the magnitude of the charging current supplied to the battery gradually decreases during the first time period (0~$t_1$), and when the magnitude of the charging current reaches the first threshold value $I_1$, the second voltage $V_2$ is applied to the battery. During the second time period ($t_1$~$t_2$), the second voltage $V_2$ is applied as the charging voltage, and the magnitude of the charging current gradually decreases during the second time period ($t_1$~$t_2$), and thus, when the magnitude of the charging current reaches a second threshold value $I_2$, the third voltage $V_3$ is applied to the battery.

Likewise, the third voltage $V_3$ is applied as the charging voltage during the third time period ($t_2$~$t_3$), and the magnitude of the charging current gradually decreases during the third time period ($t_2$~$t_3$) and when the magnitude reaches a threshold value $I_3$, the charging of the battery may be finished.

As shown in the graph of FIG. 3, the first threshold value $I_1$ is equal to or greater than the second threshold value $I_2$, and the second threshold value $I_2$ is equal to or greater than the third threshold value $I_3$.

In addition, the first to third threshold values $I_1$, $I_2$, and $I_3$ may be determined as values of the charging current at a time point when an internal resistance value of the battery is stabilized in corresponding charging stages. In an example, the first to third threshold values may be determined as values of the charging current at a time point when battery cells included in the battery are stabilized.

Therefore, the magnitudes of the charging voltages $V_1$, $V_2$, and $V_3$ described above with reference to FIG. 2 and the magnitudes of the first to third threshold values $I_1$, $I_2$, and $I_3$ may vary depending on characteristics of the battery, and are determined prior to the charging of the battery.

Figure 5:
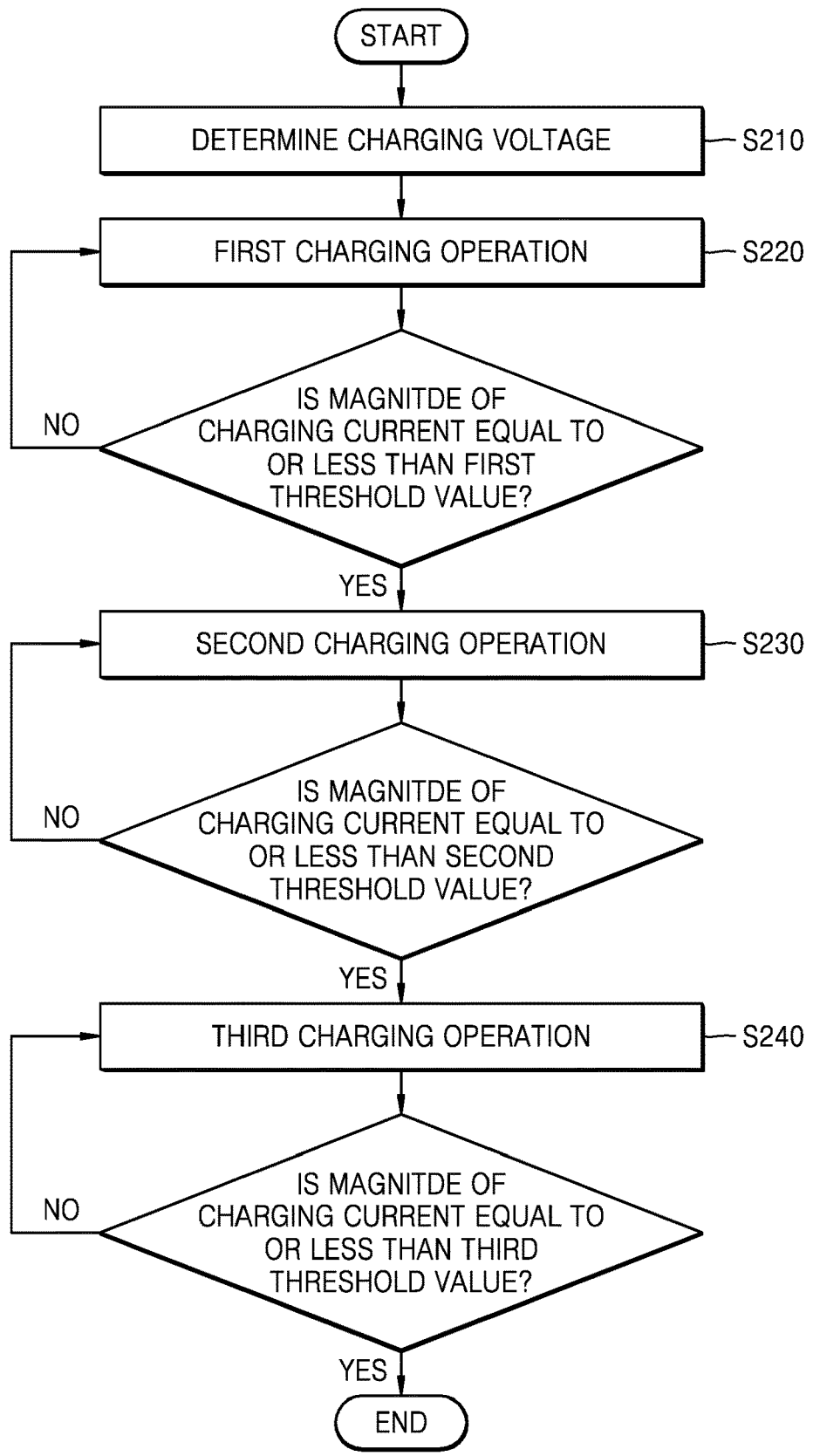
FIG. 5 is a flowchart of a battery charging method according to another example embodiment of the present disclosure.

FIG. 5 is a flowchart of a battery charging method according to another example embodiment of the present disclosure.

Referring to FIG. 5, the battery charging method according to another embodiment includes an operation of determining a charging voltage (S210), a first charging operation for charging the battery with the first voltage $V_1$ (S220), a second charging operation (S230) for charging the battery with the second voltage $V_2$ (S230), and a third charging operation for charging the battery with the third voltage $V_3$ (S240).

In the operation of determining the charging voltage (S210), a magnitude of the charging voltage for charging the battery is determined. The magnitude of the charging voltage may be determined as a voltage corresponding to a peak in a temporal variation curve of voltage versus battery resistance.

Figure 6:
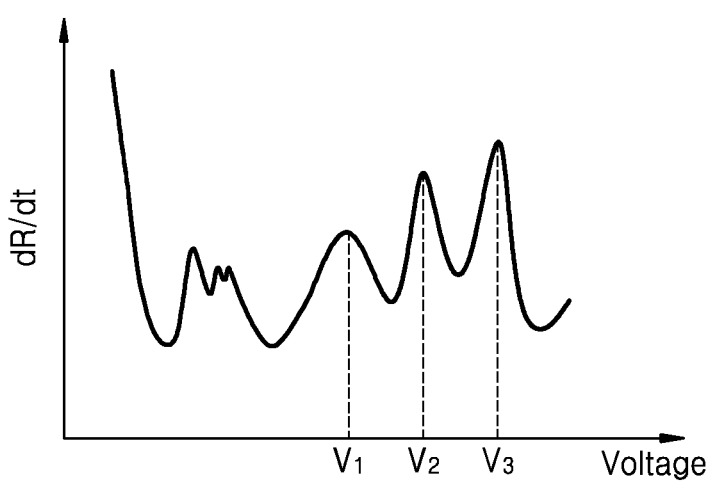
FIGS. 6-7 are graphs exemplarily showing a variation in voltage versus resistance according to time for determining a magnitude of a battery charging voltage, according to an example embodiment of the present disclosure.
Figure 7:
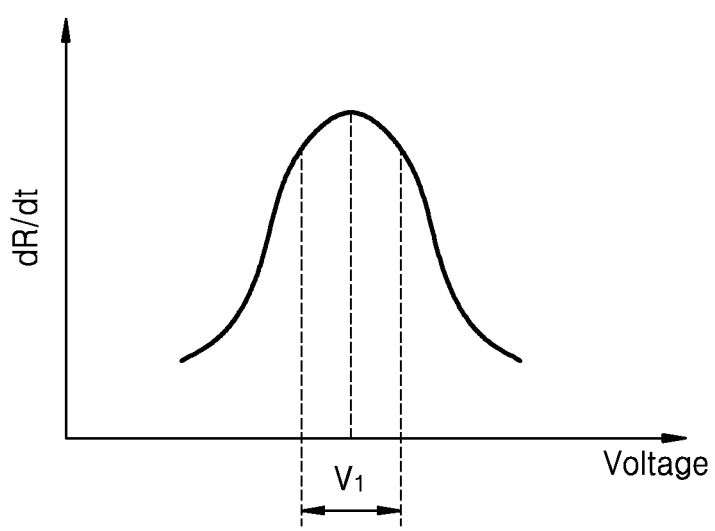

FIGS. 6-7 are graphs exemplarily showing a variation in voltage versus resistance according to time for determining a magnitude of a battery charging voltage, according to an example embodiment of the present disclosure.

As described above with reference to accompanying drawings, the battery charging method and the battery charging apparatus employing the method according to the embodiment are characterized in that the battery is charged by applying in stages the charging voltages that are determined in advance.

Here, the magnitude of the charging voltage is determined as the voltage corresponding to the peak in the temporal variation curve of the voltage versus resistance, as shown in FIG. 6. The graph of FIG. 6 is obtained in a state where electric current of a low level is applied to the battery to be charged, wherein the transverse axis (i.e., the horizontal axis) denotes voltage and the longitudinal axis (i.e., the vertical axis) denotes variation in the battery resistance according to time (e.g., the rate of change in battery resistance, i.e., dR/dt).

In the curve shown in FIG. 6, three peaks are detected, and voltages $V_1$, $V_2$, and $V_3$ corresponding to the three peaks are determined as the charging voltages of the battery. Here, the charging voltages are determined from among voltage values within an actually used voltage range of the battery, that is, not all the voltages corresponding to the peaks in the curve are determined as the charging voltages.

FIG. 7 is a graph showing an expanded view of one of the peaks included in the curve of FIG. 6. As described above with reference to FIG. 6, the voltage $V_1$ corresponding to the peak is determined as the charging voltage of the battery.

In an embodiment, a certain voltage value within a voltage range including the voltage $V_1$ may be determined as the charging voltage. For example, a voltage within a range of 99% to 101% with respect to the voltage $V_1$ corresponding to the peak may be determined as the charging voltage. In an embodiment, a voltage corresponding to a 3 dB range (e.g., a 3 dB drop) with respect to the peak may be determined as the charging voltage.

Figure 8A:
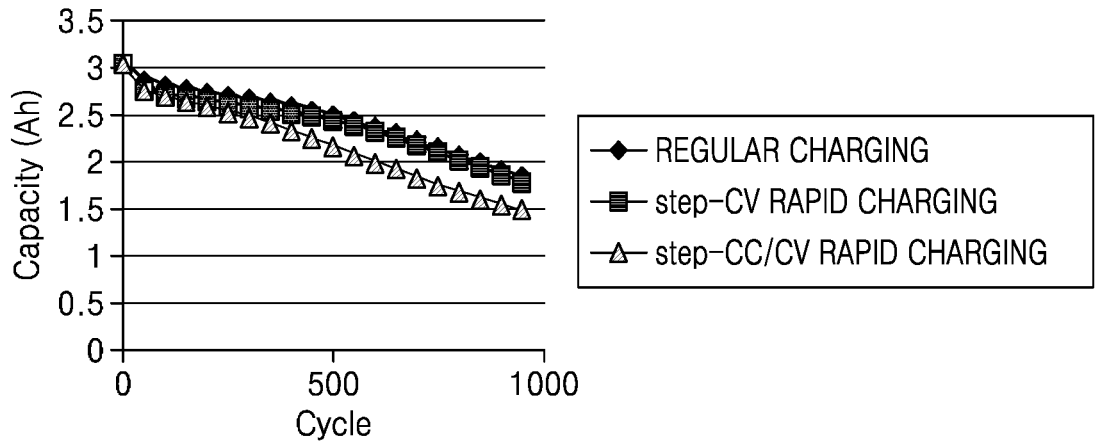
FIGS. 8A-8C are graphs illustrating comparisons of lifespans obtained by charging a battery according to a battery charging method according to an example embodiment of the present disclosure and according to various conventional methods.
Figure 8B:
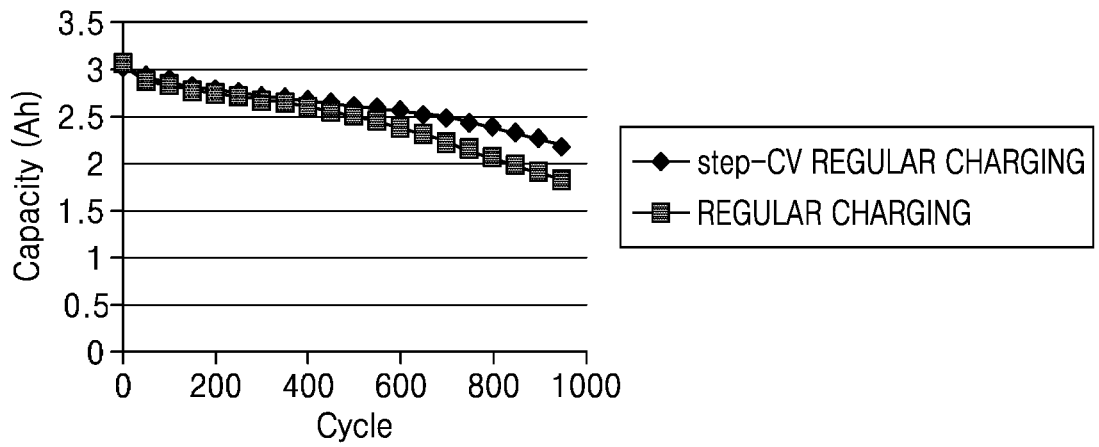
Figure 8C:
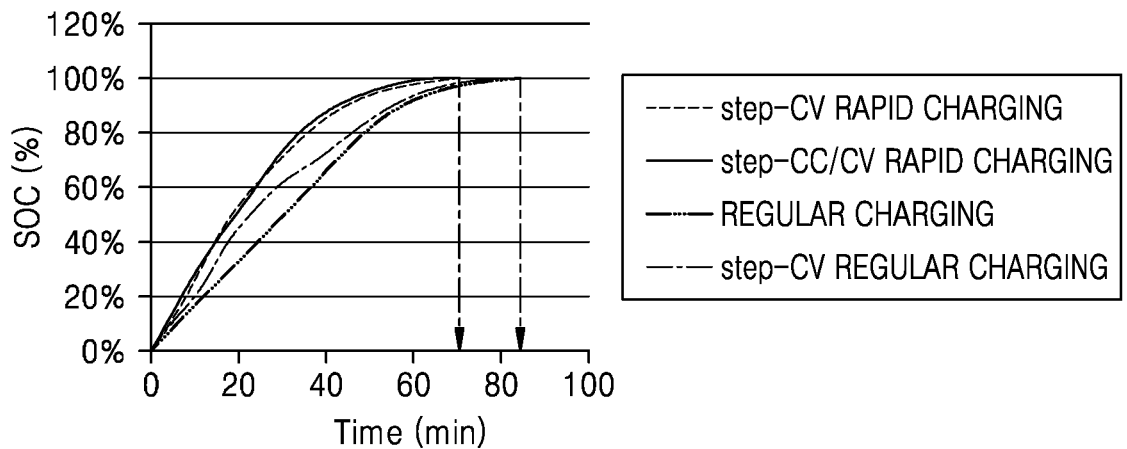

FIGS. 8A-8C are graphs illustrating comparisons of lifespans obtained by charging a battery according to a battery charging method according to an example embodiment of the present disclosure and according to various conventional charging methods.

FIG. 8A is a graph showing battery lifespan in a case in which the battery is rapidly charged by the battery charging method according to the present disclosure, versus battery lifespan in a case in which a battery is rapidly charged by a step CC/CV method.

Referring to FIG. 8A, given a same number of battery charge/discharged cycles, a higher battery lifespan (e.g., higher remaining battery capacity retained over time) is obtained in a case where the battery is rapidly charged by the battery charging method (step-CV rapid charging) according to the embodiment of the present disclosure.

In addition, in a result shown in FIG. 8A, it may be appreciated that battery full-charging times in a case where the battery is charged by the battery charging method (step-CV rapid charging) according to the present disclosure, may be set equal to battery full-charging times in a case where the battery is charged by a regular charging operation and in a case where the battery is charged by a step-CC/CV rapid charging operation.

The graph of FIG. 8B shows the lifespan of the battery when the battery charging method (step-CV regular charging) according to the present disclosure and the regular charging method are used, and shows a comparison result in a state where the time taken to fully charge the battery is set constant. Referring to the graph of FIG. 8B, it may be identified that the lifespan of the battery increases when the battery is charged by applying the constant voltages in stages according to the present disclosure.

FIG. 8C is a graph showing a comparison of the amount of time taken for the battery to be fully charged (e.g., the battery full-charging time) according to the rapid charging and the regular charging methods illustrated in the graph of FIG. 8A and the graph of FIG. 8B.

That is, referring to FIGS. 8A to 8C, when the battery charging method (step-CV regular charging and the step-CV rapid charging) according to the present disclosure is used, the lifespan of the battery may increase in a state where a current threshold value is set so that the full charging time is equal to that of the regular charging and the rapid charging of the related art.

Therefore, when the battery is charged by the battery charging method according to the present disclosure, the lifespan of the battery may increase without affecting the charging time, when compared with the charging method (step CC/CV charging) according to the related art.

According to the battery charging method and the battery charging apparatus employing the method of the present disclosure, the lifespan of the battery may be increased by reducing the stress component applied during the charging of the battery and by applying the electric current corresponding to a characteristic of each of the cells configuring the battery pack.

It should be understood that embodiments described herein should be considered in a descriptive sense only and not for purposes of limitation. Descriptions of features or aspects within each embodiment should typically be considered as available for other similar features or aspects in other embodiments.

The terms used in the present specification are merely used to describe particular embodiments, and are not intended to limit the present disclosure. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. It will be understood that although the terms "first," "second," etc. may be used herein to describe various components, these components should not be limited by these terms. These components are only used to distinguish one component from another.

As used herein, the singular forms "a" and "an" are intended to include the plural forms as well, unless the context clearly indicates otherwise. As used herein, the term "and/or" includes any and all combinations of one or more of the associated listed items. Further, the use of "may" when describing embodiments of the inventive concept refers to "one or more embodiments of the inventive concept." Also, the term "exemplary" is intended to refer to an example or illustration.

The battery charging apparatus and/or any other relevant devices or components, such as the controller, according to embodiments of the present invention described herein may be implemented utilizing any suitable hardware, firmware (e.g. an application-specific integrated circuit), software, or a suitable combination of software, firmware, and hardware. For example, the various components of the battery charging apparatus may be formed on one integrated circuit (IC) chip or on separate IC chips. Further, the various components of the battery charging apparatus may be implemented on a flexible printed circuit film, a tape carrier package (TCP), a printed circuit board (PCB), or formed on a same substrate. Further, the various components of the battery charging apparatus may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

While one or more embodiments have been described with reference to the figures, it will be understood by those of ordinary skill in the art that various changes in form and details may be made therein without departing from the spirit and scope as defined by the following claims and equivalents thereof.

What is claimed is:

1. A method of charging a battery, wherein the battery comprises a plurality of battery cells, the method comprising:
    determining magnitudes of a first voltage, a second voltage, and a third voltage, wherein the determining of the magnitudes of the first, second and third voltages, comprises determining the magnitudes of the first to third voltages as voltage values, each of the voltage values corresponding to a peak point in a temporal variation curve of internal resistance, against voltage, of the battery;
    charging the battery with the first voltage for a first time period, which constitutes a first charging period;
    charging the battery with the second voltage for a second time period, which constitutes a second charging period; and
    charging the battery with the third voltage for a third time period, which constitutes a third charging period,
    wherein lengths of the first to third time periods are determined in correspondence with a magnitude of charging current of the battery.

2. The method of claim 1, wherein each of the voltage values is included in a voltage range comprising the peak point in the temporal variation curve of internal resistance, against voltage, of the battery.

3. The method of claim 1, wherein the lengths of the first time period, the second time period, and the third time period are time periods taken for a value of the charging current in the first charging period, the second charging period, and the third charging period to reach a first threshold value, a second threshold value, and a third threshold value, respectively.

4. The method of claim 3, wherein the first threshold value is equal to or greater than the second threshold value, and the second threshold value is equal to or greater than the third threshold value.

5. The method of claim 3, wherein the first to third threshold values are charging current values at a time point when an internal resistance value of the battery is stabilized in the first charging period, the second charging period, and the third charging period, respectively.

6. A battery charging apparatus for a battery, wherein the battery comprises a plurality of battery cells, the battery charging apparatus comprising:
    a memory configured to store information about magnitudes of a first voltage, a second voltage, and a third voltage that are charging voltages for charging the battery,
    wherein the battery is charged with the first voltage, the second voltage, and the third voltage respectively within a first time period, a second time period, and a third time period, and lengths of the first to third time periods correspond with a magnitude of charging current of the battery, and wherein magnitudes of the first to third voltages are voltage values, each of the voltage values corresponding to a peak point in a temporal variation curve of internal resistance, against voltage, of the battery.

7. The battery charging apparatus of claim 6, wherein each of the voltage values is included in a voltage range comprising the peak point in the temporal variation curve of internal resistance, against voltage, of the battery.

8. The battery charging apparatus of claim 6, wherein the lengths of the first to third time periods are time periods taken for a value of the charging current in the first to third time periods to respectively reach a first threshold value, a second threshold value, and a third threshold value.

9. The battery charging apparatus of claim 8, wherein the first threshold value is equal to or greater than the second threshold value, and the second threshold value is equal to or greater than the third threshold value.

10. The battery charging apparatus of claim 8, wherein the first to third threshold values are charging current values at a time point when an internal resistance value of the battery is stabilized in respective charging stages.

* * * * *